S. M. NEVILLE.
ENGINE.
APPLICATION FILED APR. 17, 1917.
1,373,199.
Patented Mar. 29, 1921.
2 SHEETS—SHEET 1.
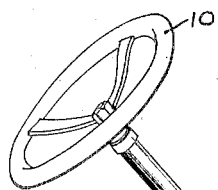
Fig. 1.
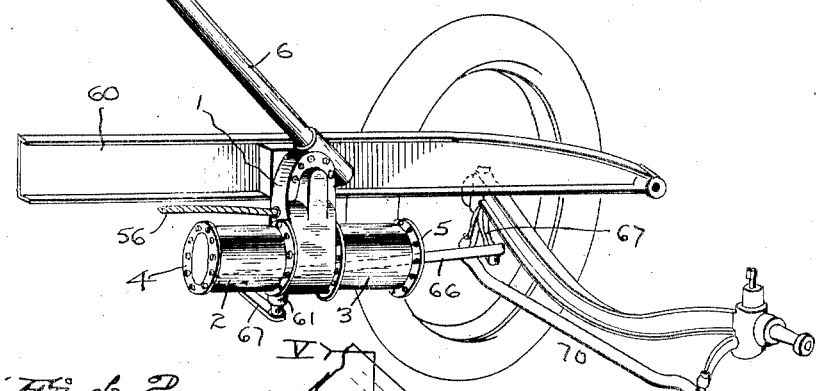
Fig. 2.
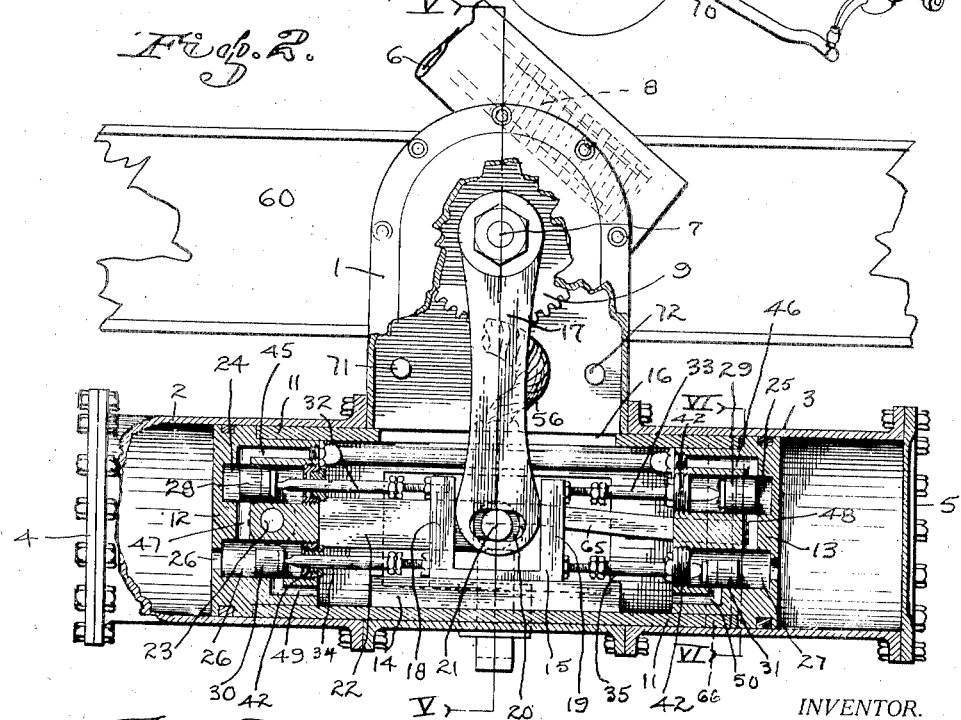
Fig. 7.
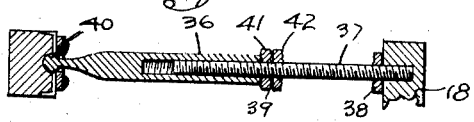
INVENTOR.
Sylvester M. Neville
BY
[signature]
ATTORNEY.

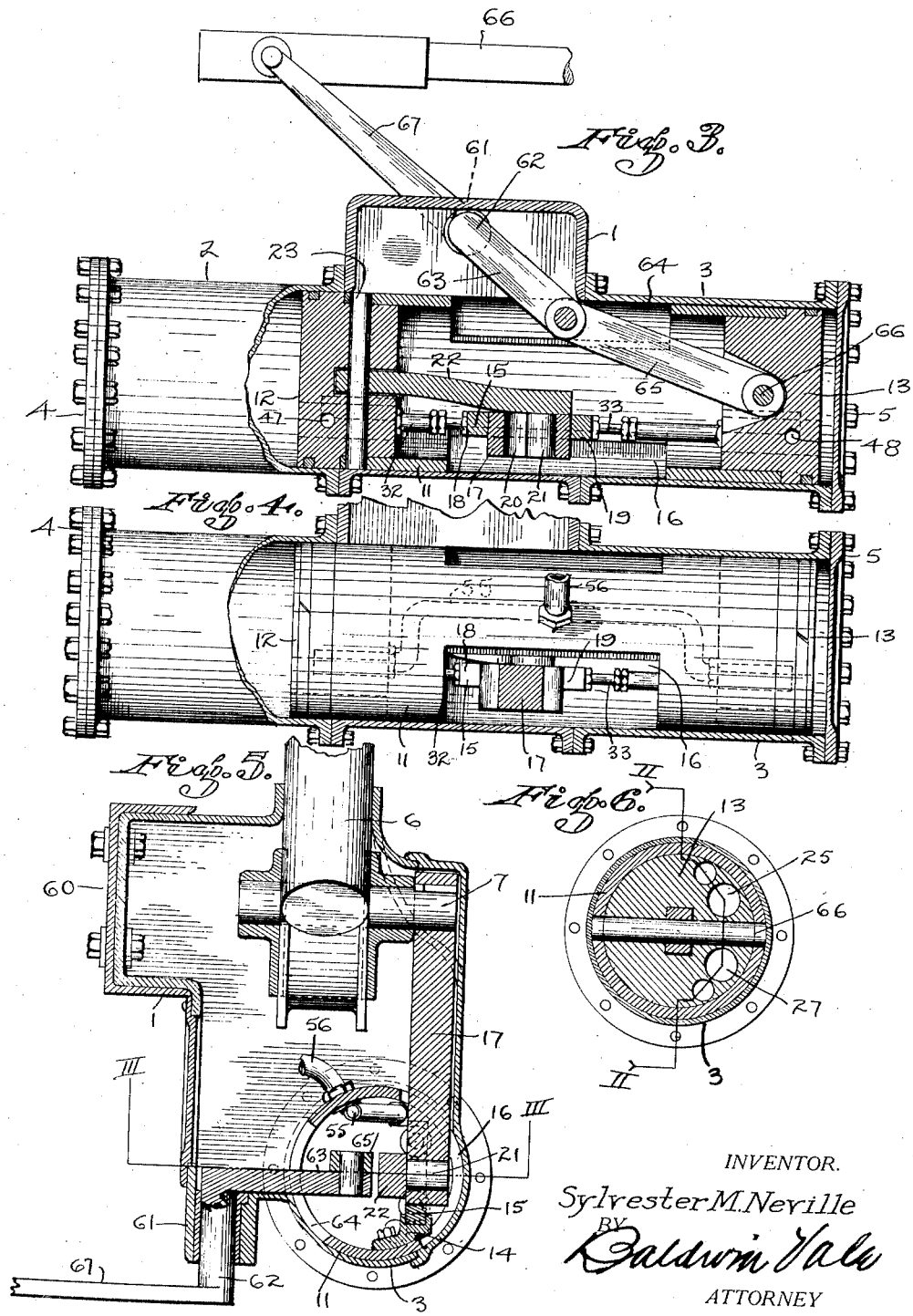

UNITED STATES PATENT OFFICE.

SYLVESTER M. NEVILLE, OF CLEVELAND, OHIO.

ENGINE.

1,373,199. Specification of Letters Patent. Patented Mar. 29, 1921.

Application filed April 17, 1917. Serial No. 162,618.

*To all whom it may concern:*

Be it known that I, SYLVESTER M. NEVILLE, a citizen of the United States, residing at Cleveland, in the county of Cuyahoga and State of Ohio, have invented a new and useful Improvement in Engines, of which the following is a full, clear, and exact description.

This invention is an improved engine.

The invention is particularly adapted to be used for steering automobiles, and operated by an ordinary automobile steering wheel.

In the accompanying drawings, forming a part of this specification, and the appended claims, I illustrate my invention in the form which I consider the best, but it is to be understood that the said invention may be embodied in other forms, and it is intended that the said claims cover the invention in whatever form it may be embodied.

The invention will be described for illustration only as being operated by compressed air.

Referring to the drawings—

Figure 1 is a perspective view of the invention, and illustrating how the invention is applied to an automobile.

Fig. 2 is a vertical longitudinal section of the invention, on line II—II of Fig. 6.

Fig. 3 is a horizontal section of the invention, on line III—III of Fig. 5.

Fig. 4 is a horizontal section of the invention, showing the piston in elevation.

Fig. 5 is a section on line V—V of Fig. 2.

Fig. 6 is a cross section of the engine, taken on line VI—VI of Fig. 2.

Fig. 7 is a sectional view of one of the valve connecting rods.

In the drawings, 1 indicates a casing, to the rear and front of which are bolted one end of cylinders 2 and 3. Heads 4 and 5 are bolted to the other ends of the cylinder. In the upper end of the casing 1 are journaled the lower end of steering post 6 and gear shaft 7, on which lower steering post end is secured worm 8 in mesh with worm gear 9, secured to gear shaft 7. On the upper end of steering post 6 is secured a steering wheel 10. In said cylinders 2 and 3 is reciprocatively mounted a hollow piston 11, the ends of which are closed by piston heads 12 and 13, which reciprocate respectively in the cylinders 2 and 3. A guide 14 is secured within the lower part of the hollow piston, midway between the piston heads, in which guide a yoke 15 is slidably mounted, to reciprocate axially in the piston. The piston is provided with an axially extending slot 16, through which extends an arm 17, secured on the gear shaft 7, the extremity of which arm fits between the vertical yoke members 18 and 19. The extremity of said arm is provided with a transverse slot 20, through which extends a pin 21, on one end of a link 22, the other end of which is pivoted by pin 23 to the piston head 12. In the piston heads 12 and 13 are provided axially extending valve ports 24 and 25 respectively, and 26 and 27 respectively, in which ports valves 28 and 29 respectively and valves 30 and 31 respectively are mounted to reciprocate axially. Rods 32 and 33 connect valves 28 and 29 respectively to the yoke members 18 and 19, and rods 34 and 35 connect valves 30 and 31 respectively to said yoke members so that the valves will recipcate with the yoke 15. The valve connecting rods 32 to 35 inclusive are each made in two telescoping sections 36 and 37, the section 37 screwing into the section 36 and into one of the yoke members. A nut 38 screws on the section 37 against the yoke member and locks the rod against screwing out of said yoke member. The sections 36 may be connected to the valves by ball and socket connections 40 so that the section 36 may be turned with rotation to the sections 37 to shorten or extend the length of the valve rods and adjust the stroke of the valves. Lock nuts 41 screw on the sections 37 against the ends of sections 36 and lock nuts 42 screw on the sections 37 against lock nuts 41 for locking the sections together, with the rods extending the proper length. Packing boxes 42 screw into the inner ends of the valve ports 24, 25, 26 and 27, through which extend the valve connecting rods 32, 33, 34 and 35, whereby leakage from the valve ports is prevented around the rods. Inlet ports 45 and 46 are respectively provided in the piston heads 12 and 13, which lead respectively into the valve ports 24 and 25. Connecting ports 47 and 48 connect valve ports 24 and 26, and valve ports 25 and 27. Outlet ports 49 and 50 are respectively provided in the piston heads 12 and 13, which lead from the valve ports 26 and 27 into the interior of the piston. An air tube 55 connects with the inner ends of inlet ports 45 and 46, which tube is connected by a flexible air tube 56 leading through the casing 1 to an air compressor not shown, by means of which compressed air is supplied to the cylinders 2 and 3, as will be hereinafter more fully described.

When the apparatus is used for steering an automobile the casing 1 is bolted to the automobile side frame member 60, as shown in Fig. 1. In the casing 1 is journaled in bearing 61, a lever 62, one arm 63 of which extends through an axial slot 64 in the piston 11, and is connected to one end of link 65, the other end of which is connected by pin 66 to piston head 13. The other arm 67 of the lever 62 extends outside of the casing 1, and is pivotally connected to steering link 66, which in turn is connected to the steering knuckle 67 of the automobile steering connections 70, as shown in Fig. 1.

Stops 71 and 72 are provided within the casing 1 for engaging the arm 17 to arrest the steering movement, the arm and steering wheel 10.

The operation of the invention is as follows:

Normally while the piston is at rest in any position, the inlet valves 28 and 29 are slightly open and the outlet valves 30 and 31 are closed so that air is admitted into both cylinders 2 and 3, and an equal pressure is maintained on each end of the piston, tending to hold the piston at rest.

Assume the invention to be in the central position, as shown in Fig. 2. Upon turning the steering wheel to the right the arm 17 is swung forwardly or to the right, according to Fig. 2, and the lower end of the arm engages the yoke member 19, and causes the yoke 15, valve connecting rods 32, 33, 34 and 35, and valves 28, 29, 30 and 31 to move forwardly. As the valves move in this manner, valve 29 closes air inlet port 46 and port 48, preventing air from entering cylinder 3; valve 31 opens outlet port 50 and allows the air to escape from the cylinder 3; valve 30 maintains outlet port 49 closed and prevents air from escaping from cylinder 2; and valve 28 opens inlet port 45, and port 47 wider, and allows compressed air to be supplied through flexible tube 56, tube 55, inlet port 45, valve port 24, connecting port 47, and valve port 26 into cylinder 2. The compressed air admitted into cylinder 2 forces piston 11 forward the distance moved by the arm 17, and yoke 15, and the piston through the medium of link 65, lever 62, connecting rod 66 and steering connections 70, turns the automobile wheels to the right to a degree corresponding to that measured by the turning of the steering wheel. When the piston has been moved as described, inlet port 45 and port 47 are brought adjacent valve 28, and inlet port 46 and port 48 are brought adjacent valve 29, permitting air to enter both cylinders 2 and 3, and establishing equal air pressure on each end of the piston, while outlet port 50 is brought adjacent valve 31, and closed by said valve 31, and outlet port 49 remains closed by the valves 30, whereupon the piston and the rest of the apparatus come to rest with the automobile wheels at the angle determined by the turning of the steering wheel. Further turning of the steering wheel to the right will repeat the above described operation of the apparatus, until the arm 17 engages the stop 72, in which position the piston will be at the end of its forward stroke and the automobile wheels will be turned to the limit of their movement to the right.

Upon turning the steering wheel to the left the arm 17 is swung rearwardly and the valves moved rearwardly, so as to open wider inlet 46 and port 48 and admit air into cylinder 3 and maintain closed the outlet port 50, and to close inlet 45 and open outlet 49, so that the air may escape from cylinder 2. The compressed air admitted into cylinder 2 moves the piston rearwardly, and the piston through the above described connections causes the automobile wheels to turn to the left to a degree determined by the movement of the steering wheel, in which position the valves permit air to enter both cylinders and establish equal pressure on the ends of the piston, causing the apparatus to come to rest with the automobile wheels so turned to the left. Further turning of the steering wheel to the left will cause the arm 17 to engage stop 71 and bring the apparatus to rest with the piston at the limit of its rearward movement and the automobile wheels at the limit of their turning movement to the left. The engagement of the arm with stops 71 and 72 prevents any strain being applied to the apparatus by the steering wheel, when the movable parts are at the limit of their movement.

If either the automobile wheels should strike an obstruction and turn to the right or left, and cause the piston to move, either forwardly or backwardly, the inlet and outlet valves would operate so as to admit air into cylinder 3 or 2, and permit air to escape from the cylinder 2 or 3, and cause the piston to move back to its former position, and automatically restore the automobile wheels to their former position, as determined by the steering wheel.

While the engine normally holds the automobile wheels in the position as determined by the steering wheel, it will be seen that the apparatus is sufficiently resilient to absorb the shocks caused by the engagement of the automobile front wheels with the road irregularities, without causing said automobile wheels to depart, except momentarily, from their predetermined course.

The movement of the piston 11 independent of the arm 17, which is permitted by the slot 20 and pin 21, when the automobile front wheels strike an obstruction, is sufficient to operate valves and restore, as described, the piston and wheels to their predetermined position, without ordinarily communicating said movement to the steering wheel and subjecting the operator to the usual shocks from the steering wheel.

In case the compressed air should not be powerful enough to operate the piston or should fail altogether, the pin 21 would engage the ends of the arm slot 20, so that the arm 17 would reciprocate the piston directly through link 22 to turn the automobile wheels.

Having described my invention, I claim as new, and desire to secure by Letters Patent:

1. An engine comprising a pair of cylinders, a piston reciprocatively mounted in said cylinders, ports in said piston, valves mounted to reciprocate axially in said piston to control said ports and normally preventing flow of power, actuating means to reciprocate said valves to cause said valves to admit power into one cylinder and shut out power from the other cylinder so that the piston will be moved by said power with relation to the valves to cause said valves to prevent further admission of power to and escape of power from the cylinders and to prevent further movement of said piston until again operated by said actuating means, and means operated by said piston.

2. An engine comprising a pair of cylinders, a piston reciprocatively mounted in said cylinders, ports in said pistons, valves carried by and mounted to reciprocate axially in said piston to control said ports, actuating means to reciprocate said valves to cause said valves to admit power into one of said cylinders and shut out power from the other cylinder to cause the piston to be moved by said power with relation to the valves a distance measured by the movement of said actuating means and into such position as to cause said valves to prevent further admission of power to and escape of power from said cylinders and to prevent further movement of said piston until it is again operated by said operating means, and means operated by said piston.

3. An engine comprising a pair of cylinders, a piston reciprocatively mounted in said cylinders, means in said piston for controlling the admission of power to and escape of power from said cylinders for reciprocating said piston, means normally operated by said piston, actuating means for said power controlling means, said actuating means including an arm having a slot, a link connected at one end to said piston, a pin on the other end of said link extending into the slot in said arm, said pin being adapted to engage said slot to enable said actuating means to operate directly, said piston operated means, upon failure of said power.

4. An engine comprising a pair of cylinders, a piston reciprocatively mounted in said cylinders and provided at opposite ends with equal effective pressure areas, inlets and outlets in said piston, valves controlling said inlets and outlets, actuating means for said valves to operate said valves to admit air through said inlets into said cylinders and to prevent the escape of air therefrom through said outlets, to cause the piston to reciprocate, means operated by said piston, said piston being adapted to move against the air in one cylinder under the influence of power applied through said piston operated means, said piston when so moved bringing said ports into such relation to said valves as to cause said valves to control said ports in such manner as to admit air into one cylinder and prevent the escape of air from the other cylinder, to move the piston and piston operated means back to their position before being moved under the influence of said piston operated means.

5. An engine comprising a pair of cylinders, a piston reciprocatively mounted in said cylinders and provided at opposite ends with equal effective pressure areas, inlets and outlets in said piston, valves controlling said inlets and outlets, actuating means for said valves to operate said valves to admit air through said inlets into said cylinders and to prevent the escape of air therefrom through said outlets, to cause the piston to reciprocate, means operated by said piston, said piston being adapted to move against the air in one cylinder under the influence of power applied through said piston operated means, said piston when so moved bringing said ports into such relation to said valves as to cause said valves to control said ports in such manner as to admit air into one cylinder and prevent the escape of air from the other cylinder, to move the piston and piston operated means back to their positions before being moved under the influence of said piston operated means, without moving said valve actuating means.

6. An engine comprising a pair of cylinders, a piston operative in said cylinders and provided at opposite ends with equal effective pressure areas, inlets and outlets in said piston, valves controlling said inlets and outlets, said valves being so arranged as normally to close said outlets and to partly open said inlets to admit air into both cylinders and establish an equal pressure on both ends of the piston and maintain said piston at rest, actuating means for said valves to operate said valves to admit more air to one cylinder and shut off the escape of air from said cylinder, and to prevent the admission of air into the other cylinder and to allow air to escape therefrom, to cause the piston to move to a point determined by said actuating means, at which point said inlets and outlets being brought back into their normal relation to said valves to establish an equilibrium of pressure on the ends of the piston and bring said piston at rest into the position into which it is so moved.

7. An engine comprising a pair of cylinders, a piston operative in said cylinders and provided at opposite ends with equal effective pressure areas, inlets and outlets in said piston, valves controlling said inlets and outlets, said valves being so arranged as normally to close said outlets and to partly open said inlets to admit air into both cylinders and establish an equal pressure on both ends of the piston and maintain said piston at rest, actuating means for said valves to operate said valves to admit more air to one cylinder and shut off the escape of air from said cylinder, and to prevent the admission of air into the other cylinder and to allow air to escape therefrom, to cause the piston to move to a point determined by said actuating means, at which point said inlets and outlets being brought back into their normal relation to said valves to establish an equilibrium of pressure on the ends of the cylinder and bring said piston at rest into a position into which it is so moved, means operated by said piston, said piston being adapted to move against the air in one cylinder under the influence of power applied to said piston operated means, into such position that said valves will admit more air into said cylinder and prevent the escape of air therefrom, and prevent the admission of air to the other cylinder and allow the escape of air therefrom to move the piston back to its normal position, before being moved under the influence of power applied to said piston operated means and maintained at rest again by an equilibrium of pressure on the ends of the piston.

8. In combination with a vehicle having a member to be shifted to steer the vehicle, of power operated means for shifting said member and comprising a cylinder, a piston in the cylinder having a connection with said member, ports including normally closed outlet ports carried by the piston, and valves coöperating with said ports for controlling the flow of motive fluid to and from opposite ends of the cylinder, said piston having equal effective pressure areas at opposite ends and normally held in equilibrium by equal pressure of motive fluid in opposite ends of the cylinder, said piston being capable of yielding through force applied to said member to be shifted and causing relative movement between the valves and ports so as to temporarily unbalance the pressures at opposite ends of the cylinder and cause the piston to be restored to its previous position whereupon the equality of pressures is restored.

9. In combination with a vehicle having a steering member to be shifted, of power operated steering mechanism for shifting said member comprising a fluid pressure cylinder, a piston movable therein and connected to said member, valves carried by the piston and controlling the flow of motive fluid to and from opposite ends of the cylinder, and normally preventing flow of motive fluid and means for shifting the valves.

10. In combination with a vehicle having a steering member to be shifted, of power operated steering mechanism including a cylinder, a piston movable in the cylinder, valve mechanism for controlling the flow of motive fluid to and from opposite ends of the cylinder, means connecting said piston to the steering member said means extending laterally through the cylinder and connected to the piston between the ends of the latter, and means for supplying between the ends of the cylinder the motive fluid which is admitted to opposite ends thereof.

11. In combination with a motor vehicle having a steering member, of power operated steering mechanism including a cylinder to which motive fluid is adapted to be admitted, a movable piston therein, valve mechanism carried by the piston, and a valve shifting member, said steering member having a connection with the piston and said valve shifting member having a connection with the valve mechanism at points between the ends of the piston.

12. In combination with a vehicle having a steering member to be shifted, of power operated mechanism for shifting said member and including a cylinder, a piston movable in the cylinder, valves carried by the piston for controlling the admission to and exhaust of motive fluid from opposite ends of the cylinder and normally preventing flow of motive fluid, a valve shifting member in the piston connected to the valves, and means for controlling said valve shifting member.

13. In combination with a vehicle having a steering member to be shifted, of power operated mechanism for shifting said member and including a cylinder, a piston movable in the cylinder and connected to the steering member, valves carried by the piston for controlling the admission to and exhaust of motive fluid from opposite ends of the cylinder, a valve shifting member in the piston connected to the valves, and a device for moving said valve shifting member, said device projecting laterally from the cylinder between the ends of the piston.

14. In combination with a vehicle having a steering member to be shifted, of power operated mechanism for shifting said member and comprising a cylinder, a piston movable in the cylinder and having a connection with said member, valve mechanism for controlling admission to and exhaust of motive fluid from opposite ends of the cylinder, and a valve shifting device connected to said valve mechanism and having a lost motion connection with the piston.

15. In combination with a vehicle having a steering member to be shifted, of power operated mechanism for shifting said member and comprising a cylinder, a piston provided with ports and connected to said member to be shifted, valves controlling the ports, a conduit for supplying motive fluid extending through the cylinder, and a supply pipe connected to said conduit and carried by the piston.

16. In combination with a vehicle having a steering member to be shifted, of power operated mechanism for shifting said member and comprising a cylinder, a piston provided with ports and valves controlling the ports, and a conduit for supplying motive fluid extending through the cylinder to the piston between the ends of the latter, and said ports and valves allowing the exhaust of the motive fluid between the ends of the cylinder.

17. In combination with a motor vehicle having a steering member to be shifted, of power operated means for operating said member and comprising a cylinder, a piston movable in the cylinder and provided with valves and ports, a member for supplying motive fluid to the ports, a member connected to the piston to operate said steering member, and a member connected to and adapted to operate the valves, said three members projecting laterally from the cylinder at points between the ends of the piston.

In testimony whereof I have hereunto set my hand at San Francisco, California, this 4th day of April, 1917.

SYLVESTER M. NEVILLE.

In presence of—
A. J. HENRY,
ALAN FRANKLIN.